United States Patent [19]

Baker

[11] Patent Number: 4,555,002
[45] Date of Patent: Nov. 26, 1985

[54] COMBINED SPRING MOUNT AND SECTIONED CAGE CONSTRUCTION

[75] Inventor: Peter J. Baker, Huron, Ohio

[73] Assignee: General Motors Corporation, Detroit, Mich.

[21] Appl. No.: 620,952

[22] Filed: Jun. 15, 1984

[51] Int. Cl.$^4$ .............................................. F16D 41/06
[52] U.S. Cl. ..................................................... 192/45
[58] Field of Search ...................... 192/45, 45.1, 41 R, 192/41 A

[56] References Cited

U.S. PATENT DOCUMENTS

| | | | |
|---|---|---|---|
| 3,055,472 | 9/1962 | Sauzedde | 192/45 |
| 4,054,192 | 10/1977 | Johnson | 192/45 |
| 4,088,211 | 5/1978 | Doller et al. | 192/45 |
| 4,185,724 | 1/1980 | Kitchin | 192/45 |
| 4,187,937 | 2/1980 | Kitchin | 192/45 |
| 4,239,304 | 12/1980 | Wakunami | |
| 4,397,507 | 8/1983 | Kraus et al. | |

*Primary Examiner*—Larry I. Schwartz
*Attorney, Agent, or Firm*—Patrick M. Griffin

[57] ABSTRACT

An improved roller retention cage for a one way clutch includes at least two adjoinable sections with abuttable flanges thereon. An energizing spring has a tail portion which is formed so as to be snap fitted around the abutted flanges, thereby structurally joining the cage sections together. This also serves to mount the energizing spring in the proper orientation to bias a lock up roller when it is retained in the cage. A cage having just two end sections so adjoined, as well as a cage made up of a plurality of sections so adjoined, are disclosed.

3 Claims, 8 Drawing Figures

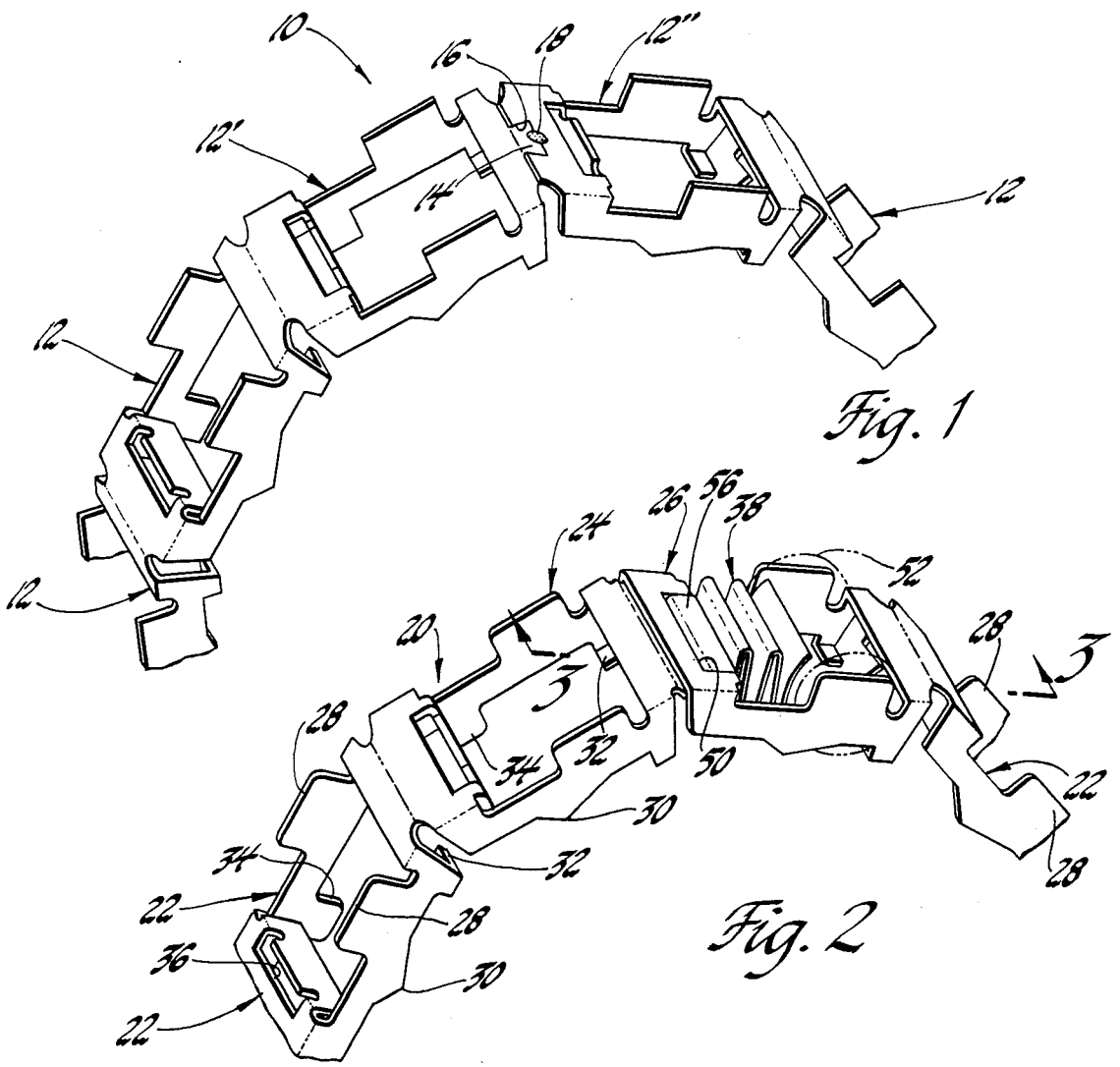
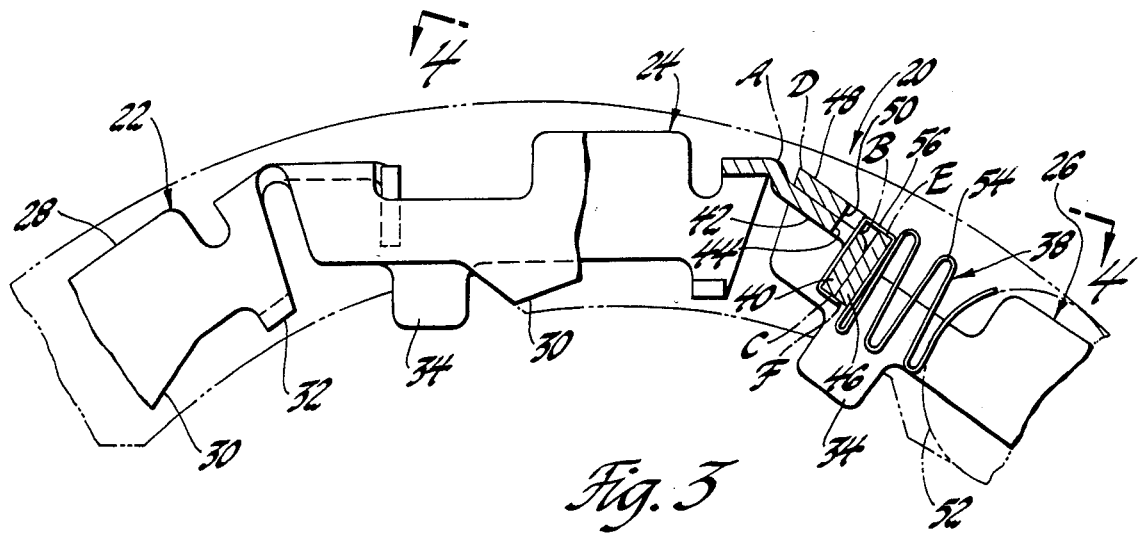

COMBINED SPRING MOUNT AND SECTIONED CAGE CONSTRUCTION

This invention relates to roller cages and specifically to an improved construction for a sectioned roller cage for a roller clutch that combines the mounting of an energizing spring and the structural retention of the cage sections.

BACKGROUND OF THE INVENTION

Roller cages such as those found in roller bearings or roller clutches are generally constructed either in a plurality of sections or folded from a single piece or blank having two terminal ends. Some means is necessary to structurally join together these separate sections or parts after they have been adjoined to complete the construction of the cage. The U.S. Pat. No. 4,397,507, Kraus et al, shows a plastic roller bearing cage formed of a single piece with two adjoinable terminal ends which are snapped together by a flexible tongue and slot. The U.S. Pat. No. 4,239,304, Wakunami, shows a roller cage made up of several separate pieces, all of which are snapped together with cooperating slots and tabs.

When the cage is one designed to retain the rollers which comprise the lock up elements of a one way roller clutch, it is not only necessary to structurally join together the separate parts of the cage, but it is also necessary to provide means to mount the roller energizing springs to the cage so that they may bias the rollers toward lock-up position. Typical of such a cage is the one disclosed in the U.S. Pat. No. 3,055,472, Sauzedde, assigned to the assignee of the present invention. There, a metal roller cage is folded from a single metal blank leaving two terminal and adjoinable ends. These are joined together by dove-tail shaped tongues and grooves, which are also spot welded.

A cage of this type is shown in FIG. 1 of the drawings. There, a sheet metal cage designated generally at 10, is folded from a single sheet metal blank and includes a plurality of integral sections designated generally at 12. All sections 12 are identical except for the two terminal sections designated at 12' and 12". These two parts of the cage 10 must be adjoined and structurally held together. The conventional means for doing so is a dove-tail flange 14 on end 12' which fits into a matching dove-tail slot 16 in end 12". A spot weld 18 completes the structure. From a manufacturing standpoint, it would be desirable to eliminate the spot welding step.

SUMMARY OF THE INVENTION

The subject invention provides an improved cage to retain the lock up rollers of a one way clutch in which the adjoinable parts of the cage are structurally joined by the tail portion of an energizing spring, also thereby mounting the energizing spring to the cage so that its bias portion is in a proper orientation to bias a lock up roller.

In the first embodiment, the cage is formed from a one piece folded metal blank with two terminal ends. Each terminal end has a generally radially extending flange and a slot therein. The two terminal ends may be adjoined by abutting the flanges thereof, which also serve to align the slots. The abutted flanges are spaced a predetermined distance away from a lock up roller to be later retained in the cage. The tail portion of an energizing spring is of a length sufficient to be bent or formed so as to snap through the aligned slots and around the abutted flanges. The tail portion keeps the flanges sufficiently tightly abutted to keep the terminal ends structurally joined together. The bias portion of the spring then extends from the tail portion for substantially the above-mentioned predetermined distance, which puts it under the proper compression to bias a lock up roller retained in the cage.

In another embodiment, the cage is formed of a plurality of separate parts or sections, each of which is adjoinable with an adjacent section by the abutment of end wall flanges thereof. The abutted end wall flanges are also spaced a predetermined distance away from a lock up roller. The tail portion of a similar energizing spring is formed to snap around the abutted end wall flanges and hold them sufficiently tightly together to structurally join the end sections. The bias portion of the spring then extends from the tail portion for substantially the same predetermined distance to be under the proper tension to bias a lock up roller retained in the cage.

It is, therefore, an object of the invention to provide an improved cage to retain the lock up elements of a one way clutch which eliminates the conventional means of structurally joining adjoinable parts of the cage.

It is another object of the invention to provide such an improved cage which eliminates the usual means of structurally joining the adjoinable parts of the cage by combining the structural joining with the mounting of an energizing spring to the cage.

It is a further object of the invention to provide such an improved cage in which the structural joining of adjoinable parts of the cage and the mounting of an energizing spring is combined by means of an energizing spring having a tail portion of sufficient length to allow it to be formed so as to interconnect abuttable structural elements on the adjoinable parts of the cage sufficiently tightly to thereby both structurally join the adjoinable parts as well as to thereby mount the energizing spring in a proper orientation to bias a lock up roller retained in the roller cage.

BRIEF DESCRIPTION OF THE DRAWINGS

These and other objects of the invention will appear from the following written description and drawings in which:

FIG. 1 is a view of a section of a prior art cage already described;

FIG. 2 is a view from the same perspective as FIG. 1 showing a first embodiment;

FIG. 3 is a view taken along line 3—3 of FIG. 2;

FIG. 1 shows the prior art and has been already described. Referring to FIG. 2, the first embodiment of the invention is designated generally at 20. Cage 20 has a plurality of integral sections 22 folded from one sheet metal blank, identical except for the two end sections designated generally at 24 and 26. Each section 22 includes a pair of spaced side walls 28 adapted to constrain the ends of a roller and a hook portion 30 adapted to engage the ramp of an inner race, not shown. A folded under bearing tab 32 is adapted to ride on the inner race, and a locating tab 34 is adapted to axially engage the face of an inner race to locate cage 20. Each section 22 also includes a slot 36 adapted to receive the tail portion of a conventional energizing spring, not shown. These features of cage 20 are conventional and are illustrated just for one section 22 thereof. The end sections of the cage 24 and 26, are the parts which are adjoinable, and each includes a structural element abuttable with a structural element on the other end section. The structural elements cooperate to allow the end sections 24 and 26 to be structurally joined by part of a novel energizing spring 38. The structural joining also mounts spring 38 to cage 20.

Figure 5:
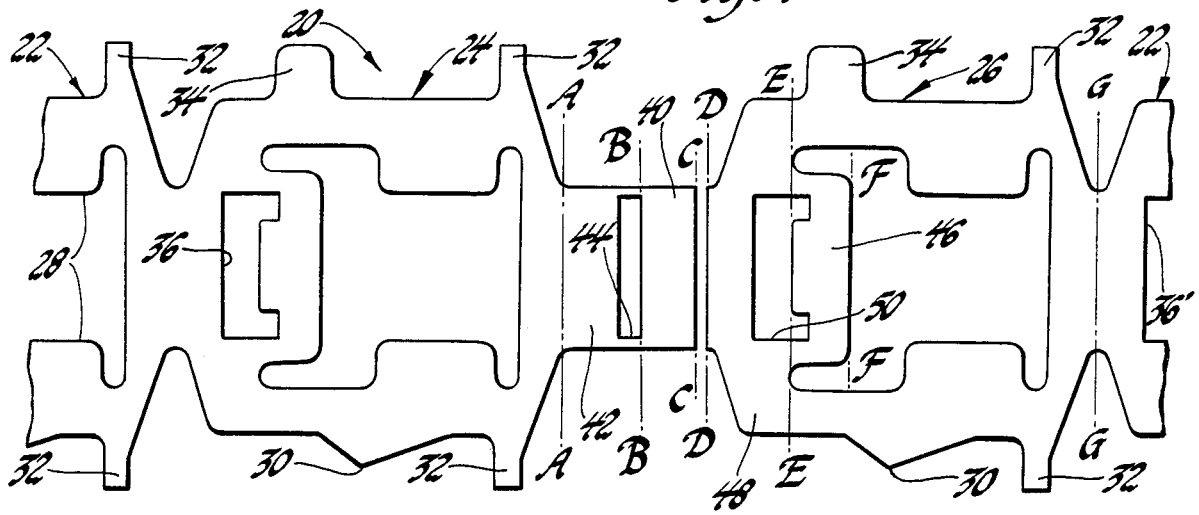
FIG. 5 is a view of the two terminal ends of a metal blank prior to being folded.

Referring next to FIG. 5, which shows the unfolded blank, end section 24 terminates in a straight edge C and comprises a generally rectangular first flange 40 extending from edge C to a fold line B. End section 24 also includes a generally rectangular second flange 42 extending from fold line B to fold line A. A generally rectangular slot 44 runs parallel to and proximate to fold line B. As may be seen by referring to FIG. 3, when the blank of FIG. 5 is folded to form cage 20, first flange 40 runs essentially radially and second flange 42 extends generally normal thereto. Flange 42 is bent down slightly at fold line A. First flange 40 constitutes one of the structural elements which allows adjoining ends 24 and 26 to be structurally joined, as will be further described below.

Referring again to FIG. 5, the other end section 26 terminates in straight edge D of the same width as straight edge C. From edge D to the fold line G, end section 26 is identical to every other section 22 of cage 20. However, for purposes of clear description, a portion of end section 26 running from fold line E to straight edge F is designated as a first flange 46. That portion of end section 26 running from fold line E to edge D is designated as a second flange 48. Second flange 48 also includes therein most of a slot 50, which is identical to slot 36.

Figure 4:
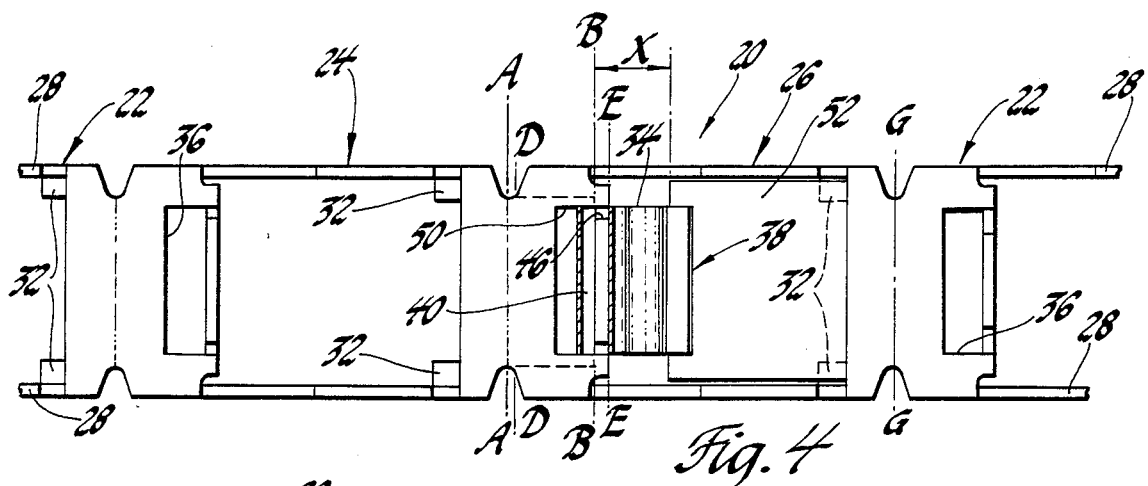
FIG. 4 is a view taken along line 4—4 of FIG. 3 with the tail portion of an energizing spring broken away.

As may be seen by referring to FIG. 3, when the metal blank is folded, the first flange 46 runs generally radially of cage 20 and second flange 48 extends generally normal thereto. End sections 24 and 26 may be adjoined by abutting the structural elements provided by the two first flanges 40 and 46. When first flanges 40 and 46 are so abutted, edges C and F are adjacent and slots 50 and 44 generally aligned. The two second flanges 42 and 48 overlie one another. FIG. 4 also shows the abutment of first flanges 40 and 46 and the alignment of slots 50 and 44. FIG. 4 also shows that the abutted first flanges 40 and 46 are spaced a predetermined distance X away from the desired location of a lock up roller, designated at 52. The purpose of this is described below.

Figure 8:
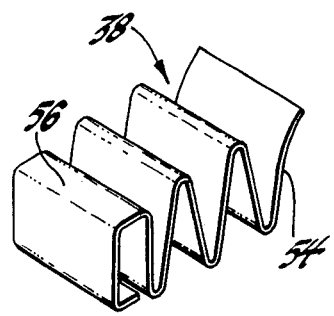
FIG. 8 is a perspective view of the energizing spring of this invention.

Referring next to FIG. 8, the energizing spring 38 includes a bias portion 54 and the tail portion 56. Tail portion 56 has a length sufficient to allow it to be bent or formed into the general C shape shown. The steel generally used in energizing springs is resilient and suitable for sharp corner bending. This, in turn, allows tail portion 56 to be snap fitted around and interconnect the abutted first flanges 40 and 46, as seen in FIG. 3. This snap fit maintains first flanges 40 and 46 sufficiently tightly together to in turn keep end sections 24 and 26 structurally joined. The importance of the structural joining of ends 24 and 26 diminishes when cage 20 is in place between a pair of races. Since the engagement of the hook portions 30 with the ramps of the inner race will act to maintain cage 20 circumferentially in place, the interconnection provided by tail portion 56 will not be highly loaded.

When tail portion 56 of spring 38 is in place, as seen in FIG. 2, spring 38 will also be mounted to cage 20. Bias portion 54 will then extend out toward lock up roller 52. Bias portion 54 has a length when uncompressed, as seen in FIG. 8, greater than its compressed length, which is substantially the distance X in FIG. 4. The difference between the compressed and uncompressed lengths of bias portion 54 is chosen to give sufficient tension to bias roller 52 against the adjacent cage section 22, as seen in FIG. 2. This maintains roller 52 in the cage 20 during shipping. Spring 38 also serves to energize roller 52 when the cage 20 is in place between a pair of races. The other energizing springs that would fit into slots 36 of the other sections 22 would be of conventional design, and are not illustrated.

Figure 6:
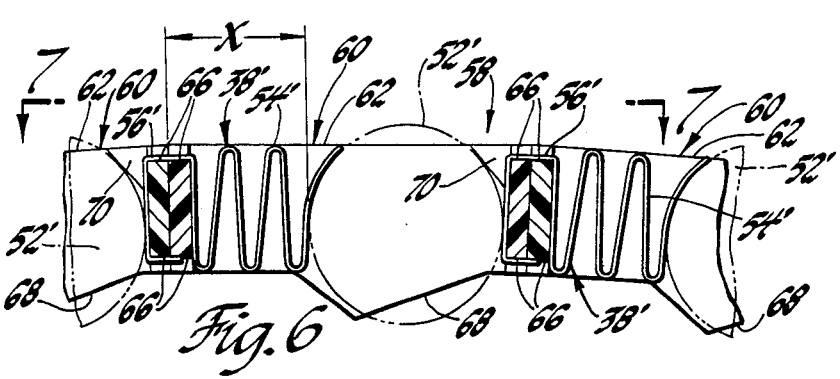
FIG. 6 is a cross-sectional view of part of a second embodiment of the invention.
Figure 7:
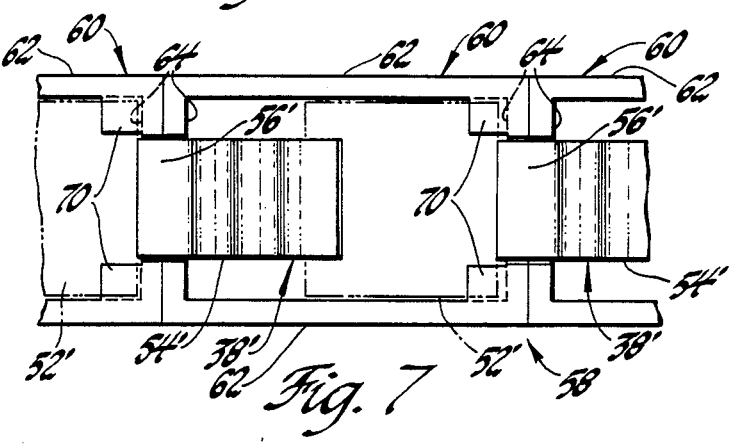
FIG. 7 is a view taken along the line 7—7 of FIG. 6.

Referring next to FIGS. 6 and 7, a second embodiment of the invention designated generally at 58 is a cage made up of a plurality of separate sections 60, each of which is generally box shaped. Cage sections 60 could be of molded plastic or any other suitable material. Each section 60 includes a pair of side walls 62 and end walls 64 which are reduced in width at the center top and bottom to form a pair of abuttable flanges 66. One or both side walls 62 of each section 60 has a hook portion 68, similar to the first embodiment. One end wall 64 of each section 60 includes curved roller rest surfaces 70. Each section 60 may be adjoined with an adjacent section 60 by abutting the flanges 66, as best seen in FIG. 6. The abutted flanges 66 are also spaced a predetermined distance X away from a lock up roller similar to the first embodiment, and numbered 52'.

Still referring to FIG. 6, a spring 38', similar to spring 38 of the first embodiment, has a similar bias portion 54' and a tail portion 56'. Tail portion 56', as in the first embodiment, is sufficiently long to allow it to be formed or bent so as to be snap fittable around the abutted flanges 66. This snap fit is sufficiently tight to keep the abutted flanges tightly abutted to in turn keep the adjacent cage sections 60 structurally together. This snap fit also mounts spring 38' to cage 58. Again, hook portions 68 keep the interconnection provided by tail portion 56' from being highly loaded when cage 58 is in place. Similar to the first embodiment, the uncompressed length of bias portion 56' is related to the distance X so as to properly bias the lock up roller 52' against roller rest surfaces 70. This retains roller 52' in cage 58. Thus, the second embodiment operates essentially identically to the first embodiment, but with each energizing spring 38' also serving as a structural member, rather than just one.

Modifications of the disclosed embodiments may be imagined. The structural elements on the adjoining cage parts may be of any shape which allows them to be abutted and used to join the cage parts together. Additionally, the tail portion of the spring could be formed around the abutting structural elements as a last step, as long as it was long enough to extend far enough around to maintain them tightly together. It would be possible to bend out a separate tab of the tail portion to act as a roller rest surface. Other modifications of the structure within the spirit of the invention may be imagined, and it is not intended to be limited to those embodiments disclosed.

The embodiments of the invention in which an exclusive property or privilege is claimed are defined as follow:

1. An improved cage for retaining the lock up elements of a one way clutch or the like, said cage having a connecting means to both structurally join together adjoinable parts of the cage and to mount to the cage an energizing spring biasing one of the lock up elements, said connecting means comprising;

at least two structural elements, one provided on each adjoinable cage part, and adapted to be in abutting relation to each other when the cage parts are adjoined, said structural elements when in abutting relation, being spaced a predetermined distance from said lock up elements, and an energizing spring with a tail portion having a length sufficient to interconnect said structural elements in sufficiently tight abutting relation with each other to thereby structurally join the adjoinable cage parts together, as well as to thereby mount said energizing spring to the cage, said energizing spring having a bias portion extending from said tail portion substantially said predetermined distance toward said lock up element to bias said lock up element when said lock up element is retained in said cage.

2. An improved cage for retaining the lock up elements of a one way clutch or the like, said cage having a connecting means to both structurally join together adjoinable parts of the cage and to mount to the cage an energizing spring biasing one of the lock up elements, said connecting means comprising;

at least two structural elements, one provided on each adjoinable cage part, and adapted to be in abutting relation to each other when the cage parts are adjoined, said structural elements, when in abutting relation, being spaced a predetermined distance from said lock up element, and an energizing spring with a tail portion having a length sufficient to allow it to be formed around said structural elements so as to interconnect them in sufficiently tight abutting relation with each other to thereby structurally join the adjoinable cage parts together, as well as to thereby mount said energizing spring to the cage, said energizing spring having a bias portion extending from said tail portion substantially said predetermined distance toward said lock up element to bias said lock up element when said lock up element is retained in said cage.

3. An improved cage for retaining the lock up elements of a one way clutch or the like, said cage having a connecting means to both structurally join together adjoinable parts of the cage and to mount to the cage an energizing spring biasing one of the lock up elements, said connecting means comprising;

at least two flanges, one provided on each adjoinable cage part, and each extending generally radially of the cage so as to be in abutting relation to each other when the cage parts are adjoined, said flanges, when in abutting relation, being spaced a predetermined distance from said lock up element, and an energizing spring with a tail portion having a length sufficient to allow it to be formed so as to be fitted around the abutted flanges to maintain them in sufficiently tight abutting relation with each other to thereby structurally join the adjoinable cage parts together, as well as to thereby mount said energizing spring to the cage, said energizing spring having a bias portion extending from said tail portion substantially said predetermined distance toward said lock up element to bias said lock up element when said lock up element is retained in said cage.

* * * * *